June 7, 1949. I. W. COX ET AL 2,472,368
PLASTICITY RESPONSIVE WELDER
Filed July 18, 1947 2 Sheets-Sheet 1

Inventors
Irwin W. Cox
Lester D. Drugmand
By
Attorney

June 7, 1949. I. W. COX ET AL 2,472,368
PLASTICITY RESPONSIVE WELDER
Filed July 18, 1947 2 Sheets-Sheet 2

Inventors
Irvin W. Cox
Lester D. Drugmand
By Frank W. Bullard
Attorney

Patented June 7, 1949

2,472,368

UNITED STATES PATENT OFFICE 2,472,368

PLASTICITY RESPONSIVE WELDER

Irvin W. Cox, West Allis, and Lester D. Drugmand, Greenfield, Wis., assignors to Cutler-Hammer, Inc., Milwaukee, Wis., a corporation of Delaware Application July 18, 1947, Serial No. 761,976

10 Claims. (Cl. 219—4)

1

The invention relates to a system for accurately controlling the heating current supplied to a workpiece to be welded, brazed or soldered in response to resistance variations between the welding surfaces and while not limited thereto is especially adapted to the welding of small parts.

An object of the invention is to provide means for the control of the welding energy in accordance with the resistance offered by the workpiece to the flow of said energy.

Another object is to provide means for proportioning the amount of welding energy in accordance with the heating effect thereof on the welding area between the two parts to be welded.

Another object is to provide means for controlling the welding energy in response to the progress of the heating of the parts to be welded.

Another object is to provide a welding system which terminates the supply of welding energy when the material in the area to be welded has reached the required plasticity to afford a strong weld upon subsequent cooling.

Another object is to provide a welding system with means which prevents the supply of excess welding energy which would result in overheating and undesired deformation of the object to be welded.

Another object is to provide means for the rapid production of sound joints by welding, brazing or soldering.

Another object is to provide a welding system which supplies the total welding energy to the area to be welded in a time so short that the heat flow to the ambient area outside of the weld is insufficient to produce undesired and injurious heating thereof.

Other objects and advantages will hereinafter appear.

The accompanying drawing is illustrative of an embodiment of the invention. In the drawing, Figure 1 illustrates a welding controller embodying the invention.

Figure 1:
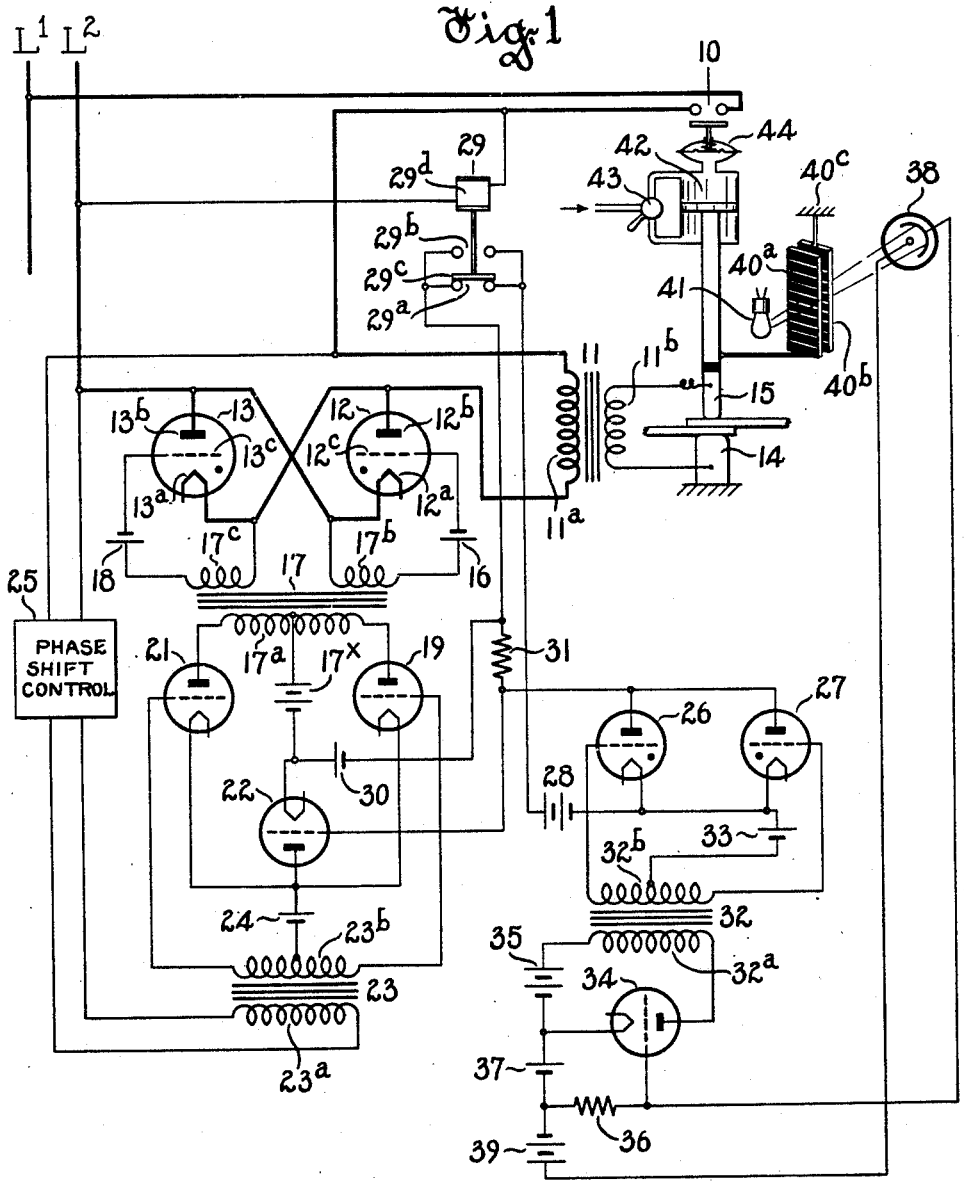

Referring to Fig. 1, the system is supplied with energy from the bus bars $L^1$, $L^2$ of an alternating current supply. Connected to the bus bar $L^1$ in series with a pressure responsive switch 10 is one

2 terminal of the primary winding $11^a$ of a welding transformer 11. The second terminal of the primary winding is connected to the anode $12^b$ of the thyratron tube 12 and also to the cathode $13^a$ of a thyratron 13. The cathode $12^a$ of thyratron 12 and the anode $13^b$ of thyratron 13 are jointly connected to line $L^2$ of the power supply. The secondary winding $11^b$ of the transformer 11 is connected between the stationary jaw 14 and the movable jaw 15 of a welding machine. The thyratron 12 has a control electrode $12^c$ which is connected to its cathode $12^a$ through a bias battery 16 and the secondary winding $17^b$ of a transformer 17, so that said control electrode $12^c$ normally blocks conduction of thyratron 12. The control electrode $13^c$ of thyratron 13 is similarly connected in series with a bias battery 18 and another secondary winding $17^c$ of transformer 17 to the cathode $13^a$ of thyratron 13.

The center tapped primary winding $17^a$ of transformer 17 has its end terminals connected to the anodes of high vacuum tubes 19 and 21, respectively. The center tap of said primary winding $17^a$ is connected through a battery $17^x$ to the cathode of a high vacuum tube 22, while the anode of said tube 22 is connected to the cathodes of both of the tubes 19 and 21. The tubes 19 and 21 are each provided with a control electrode, each of which is connected to one of the end terminals of the center tapped secondary winding $23^b$ of a transformer 23. The center tap of said winding $23^b$ is connected through a bias battery 24, to the anode of the high vacuum tube 22. The primary winding $23^a$ of the transformer 23 is connected through a phase shift control network of any suitable type 25, across the bus bars $L^1$ and $L^2$, upon closure of pressure responsive switch 10. The tube 22 is provided with a control electrode which is connected to the parallel connected anodes of thyratrons 26 and 27.

The parallel connected cathodes of said thyratrons 26 and 27 are connected, through a battery 28, to one contact each of two pairs of spaced stationary contacts $29^a$ and $29^b$, respectively, of an electromagnetic relay 29, which has a bridging contact $29^c$, said bridging contact $29^c$ completing a circuit between one or the other of the pairs of stationary contacts $29^a$ and $29^b$ in either of the respective extreme positions of contact $29^c$; the circuit through each pair of stationary contacts 29ᵃ and 29ᵇ, of course, being momentarily opened during movement of contact 29ᶜ between its extreme positions. The movable contact 29ᶜ is attached to the armature of the relay which also has an energizing coil 29ᵈ, connected in series with the contacts 10 across the lines L¹, L². The second contacts of the two pairs of contacts 29ᵃ and 29ᵇ are connected through a bias battery 30 to the cathode of the tube 22 and also through a resistance 31 to the anodes of the thyratrons 26 and 27.

The thyratrons 26 and 27 are each provided with a control electrode each of which is connected to one of the end terminals of the center tapped secondary winding 32ᵇ of a transformer 32. The center tap of said winding 32ᵇ is connected through a bias battery 33 to the cathodes of the thyratrons 26 and 27. The primary winding 32ᵃ of the transformer 32 has one of its terminals connected to the anode of an amplifying tube 34, while its other terminal is connected through a battery 35 to the cathode of said tube 34. The control electrode of the tube 34 is connected in series with a resistor 36 and a bias battery 37 to the cathode of the tube 34 and is also connected to the anode of a photoelectric cell 38, the cathode of said photoelectric cell being connected through a battery 39 to the common terminal of the resistor 36 and the battery 37.

Connected to the movable welding electrode 15 so as to move in unison therewith is one element 40ᵃ of a pair of light transmitting gratings; the stationary grating element 40ᵇ being attached to a support 40ᶜ. The arrangement is such that upon movement of electrode 15 the element 40ᵃ of the grating will move a like distance. The motion of said movable grating element 40ᵃ relative to the stationary grating element 40ᵇ alternately permits and prevents the transmission of light from a stationary light source 41 to the cathode of the photoelectric cell 38, so as to alternately change the conduction of the cell in accordance with such motion.

The movable welding jaw or electrode 15 may be actuated as follows: The upper end of electrode 15 is attached to the piston of a hydraulic cylinder 42 which is provided with a reversing valve 43 to selectively admit pressure to the two ends of the cylinder 42 to reciprocate the piston therein. The upper end of the cylinder 42 is connected to a diaphragm 44 or any other suitable pressure responsive switch operating mechanism which in turn operates the contacts 10 when the pressure in the upper end of the cylinder 42 reaches a certain value.

The apparatus shown in Fig. 1 functions in the following manner: The impedance of the photoelectric tube 38 varies with the light from the light source 41 which is transmitted to it through the grating elements 40ᵃ, 40ᵇ, and therefore in accordance with the motion of the movable element 40ᵃ relatively to the stationary element 40ᵇ of the grating. This varies the current of the battery 39 which produces corresponding variations of the voltage drop in the resistor 36 and consequent variations of the potential impressed upon the control electrode of the tube 34. The resulting variations in the current through the tube 34 induces corresponding voltages in the primary winding 32ᵃ of the transformer 32. These voltages are in opposite directions depending upon whether the current through the primary winding 32ᵃ increases or decreases. Corresponding voltages are induced in the two halves of the transformer secondary winding 32ᵇ. The voltages of the two halves of the secondary winding 32ᵇ are impressed upon the grids of the tubes 26 and 27, respectively, which are normally biased against initiation of current flow by the battery 33. The tube which has impressed thereon a supplemental positive potential becomes conducting, passing a current from the battery 28, through the active set of stationary contacts of the relay 29, the resistor 31, back through the respective conducting tube 26 or 27 to the battery 28. As this current is a unidirectional current, the corresponding tube 26 or 27 remains conducting until the current is interrupted by operation of the relay 29. Thus one or the other tube 26 or 27 becomes conducting by the superposition of the voltage induced in one half of the transformer secondary winding 32ᵇ, as aforedescribed. The resulting voltage drop in the resistor 31 is such as to render the control electrode or grid of the tube 22 negative with respect to the cathode of said tube so that tube 22 is non-conducting.

The phase shift device 25 is normally so adjusted that the alternating potential which it impresses upon the grids of the tube 19 and 21 becomes positive to initiate conduction by these tubes when the positive plate voltage of said tubes is approximately a maximum, so that these tubes when rendered conducting will conduct current during approximately ½ of the positive half cycle, but the adjustment may be changed to give a longer or a shorter period of conduction during the respective positive half cycle.

The negative potential impressed upon the control electrode of the tube 22 by the voltage drop in resistor 31 is such as to render said tube non-conducting. There is therefore under these conditions no voltage impressed upon the main discharge path of tubes 19 and 21 and therefore no voltage is induced in the transformer 17. The grids of the tubes 12 and 13 are so biased by the batteries 16 and 18, respectively, that conduction therethrough is blocked under these conditions.

If now a pair of workpieces are introduced between the welding electrodes 14 and 15 and fluid under pressure is admitted to the cylinder 42 by manipulation of the valve 43, the movable electrode 15 moves toward the stationary electrode 14 to clamp the workpieces together until ultimately the movable electrode comes to rest and the pressure rises in the cylinder 42 so as to actuate the diaphragm 44 which in turn closes the switch 10. Closure of switch 10 establishes a circuit from line L¹, through switch 10, through the primary winding 11ᵃ of transformer 11, through the tubes 12 and 13, respectively, back to line L². A circuit is also established from line L¹, through switch 10, through the phase shifting device 25, the primary winding 23ᵃ of transformer 23, back to line L². Energization of the transformer 23 impresses voltages on the grids of tubes 19 and 21 which regulates the conduction of the respective tubes, provided that the tube 22 is conducting.

As soon as switch 10 closes it also effects energization of coil 29ᵈ, thus opening the circuit between contacts 29ᵃ and shortly thereafter closing the circuit again between contacts 29ᵇ. Thus the relay 29 momentarily interrupts the main circuit of the tubes 26 or 27, respectively, which renders them thereafter non-conducting due to their negative bias, thereby eliminating the voltage drop in resistor 31. This in turn renders the grid of the tube 22 positive with respect to its cathode so that the tube 22 becomes conducting. Thereupon a positive potential which is the resultant of the potential of the battery 24 and the alternating potential of the transformer 23 is impressed upon the grids of tubes 19 and 21 to render the respective tubes alternately conducting. The resulting current induces voltages in the primary winding 17a and secondary windings 17b, 17c of the transformer 17 which in turn will cause firing of the tubes 12 and 13, respectively. Thus current flows through the primary winding 11a of the transformer 11 which induces a welding current in the secondary winding 11b to pass between the electrodes 14 and 15, through the workpieces to weld the same.

As the material of the workpieces gets soft it yields to the pressure of the movable electrode 15 and the latter moves slightly downward thereby actuating the grating element 40a to change the current through the photoelectric cell 38 and the resistor 36 in the manner aforedescribed. The voltage induced in the windings 32b of transformer 32 varies the potential of the grids of tubes 26 or 27, respectively, to cause one of the tubes to start conducting, thereby sending a current through the resistor 31, which as aforedescribed again renders the tube 22 nonconducting. As soon as the tube 22 becomes nonconducting it again interrupts current flow through the tubes 19 and 21. Interruption of conduction of the tubes 19 and 21 stops the supply of ignition potential to the grids of the tubes 12 and 13, thereby interrupting the flow of current through the primary winding 11a of the transformer 11. It will thus be seen that the flow of welding current starts in response to the pressure exerted by the electrode 15 upon the workpieces and is terminated upon softening of the material and yielding thereof in response to the pressure of the movable electrode 15.

The amount of energy which is supplied during the welding period may be regulated by regulating the phase shifting network in a well known manner. It will further be apparent that the motion which is necessary to stop the flow of welding current after initiation thereof may be determined by the selection of the fineness of the grating 40. Furthermore, the control function of the grating does not depend upon the absolute thickness of the material between the electrodes, but only upon change in the relative distance between the welding electrodes due to the melting or softening of metal therebetween.

Figure 2:
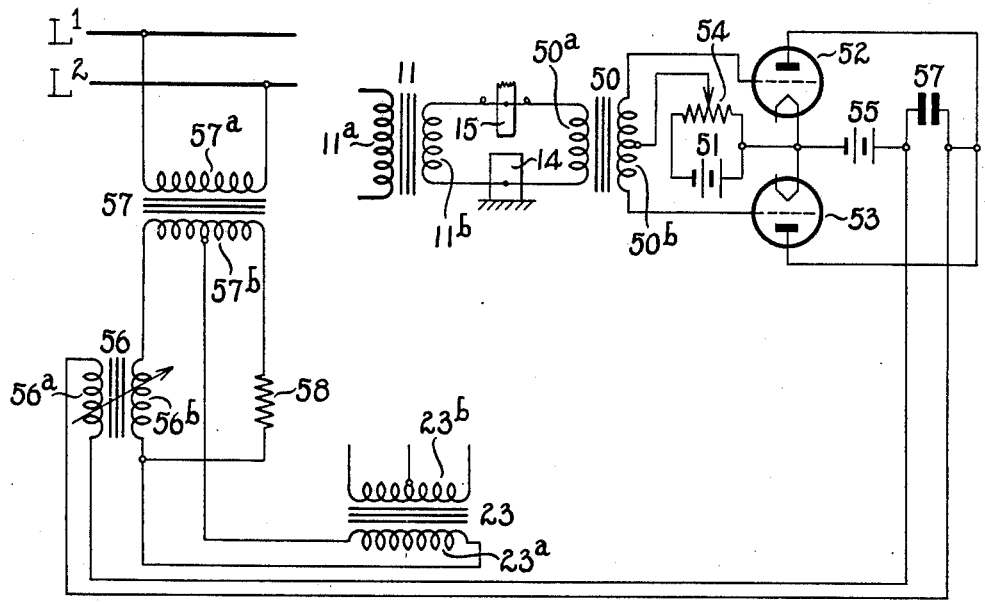
Fig. 2 illustrates certain refinements of the system shown in Fig. 1.

The modification illustrated in Fig. 2 provides for automatically controlling the current supplied to the weld in response to variations of the initial contact resistance between the parts to be welded. The drawing shows the additions which have to be made to the system illustrated in Fig. 1 to attain the desired results.

Connected across the welding electrodes 14 and 15 and in parallel with the secondary winding 11b of transformer 11 is the primary winding 50a of a step-up transformer 50 which has also a center tapped secondary winding 50b. Thus the voltage induced in said secondary winding 50b is a function of the voltage drop across the electrodes 14 and 15. The center tap of secondary winding 50b of transformer 50 is connected through a bias battery 51 to the cathodes of two electron tubes 52 and 53. The battery 51 is paralleled by an adjustable resistor 54. The anodes of the tubes 52 and 53 are connected together, while their control electrodes are connected to the end terminals of the secondary winding 50b of transformer 50. Connected between the cathodes and anodes of the tubes 52 and 53 is a battery 55 in series with the direct current energizing winding 56a of a saturable reactor 56. The winding 56a is paralleled by a smoothing condenser 57. An alternating current winding 56b of the saturable reactor 56 is connected in series with the primary winding 23a of the transformer 23 (shown also in the system of Fig. 1) across the center and one outer terminal of the center tapped secondary winding 57b of a transformer 57. The primary winding 57a of said transformer is connected across the lines $L_1$, $L_2$. Connected between the terminal common to the winding 56b and the primary winding 23a of transformer 23 and one of the outer terminals of the winding 57b is a resistor 58. Hence the winding 56b and the resistor 58 form with the winding 57b a phase shifting network. This permits changing the phase of the voltage impressed on the primary winding 23a of transformer 23 with respect to the voltage supplied by the lines $L_1$, $L_2$, by varying the impedance of the saturable reactor 56 through variation of the current in the direct current winding 56a.

The system with the modifications of Fig. 2 functions as follows: The resistor 54 is so adjusted that for the normal resistance to current flow between the parts to be welded the tubes 52 and 53 are non-conducting. The correct adjustment can be determined by adjusting the resistor 54 so that for normal operation the bias of the tubes 52 and 53 is just sufficient to prevent conduction of said tubes. Upon welding under normal conditions the proper amount of welding current will then be supplied in the manner aforedescribed in connection with Fig. 1 and the flow of current is interrupted as the material melts and the workpieces yield to the electrode pressure, while no current flows through the tubes 52 and 53 into energizing winding 56a.

If now for some reason (for instance, due to oxide) the resistance between the pieces to be welded increases and the voltage across the welding electrods 14 and 15 is somewhat higher than normal due to the decreased current and resulting voltage drop in the secondary winding 11b of the transformer 11, the voltage impressed upon the grids of the tubes 52 and 53 is increased so as to render these tubes conducting, thereby passing an energizing current through the winding 56a which reduces the impedance of the saturable reactor 56 and advances the phase of the voltage impressed upon the primary winding 23a of transformer 23. This in turn advances the moment of ignition of the tubes 19 and 21 (see Fig. 1) and correspondingly advances the ignition of the tubes 12 and 13 so that higher effective current pulses are supplied to the welding electrodes. Thereupon the voltage across the electrodes 14 and 15 rises to a point where it breaks down the high resistance between the parts to be welded and thus cause a current flow which tends to increase as the metal melts. As soon as the resistance to the current flow between the pieces decreases the voltage impressed on the winding 50a decreases again correspondingly, thereby returning the grid potential of tubes 19 and 21 to normal, which in turn also results in retardation of the moment of ignition of tubes 12 and 13 to the preset normal value, until ultimately upon the required relative movement of one grating with respect to the other the welding current is stopped as aforedescribed in connection with Fig. 1.

Figure 3:
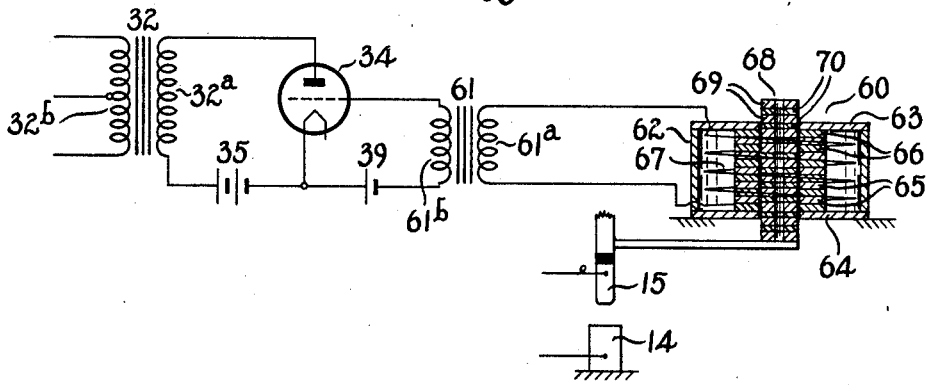
Fig. 3 illustrates a modification of certain elements of the system shown in Figs. 1 and 2.

Fig. 3 shows a modification of the part of the system which generates an initiating voltage in response to movement of the movable electrode. In this modification the grating and the photoelectric cell with its amplifying tube is replaced by a recurrently variable flux voltage impulse transformer 60. The output circuit of the transformer 60 is connected to the primary winding 61a of a transformer 61 whose secondary winding 61b is connected in series with the battery 39 between the cathode and the control electrode of tube 34 of the system Fig. 1.

The recurrently variable flux transformer 60 has a stationary magnetic frame comprising a permanent magnet in the form of a hollow cylinder 62. The two ends of the cylinder are closed by ferromagnetic rings 63 and 64, respectively. Concentric with the central axis of the structure are arranged alternate rings of magnetic and nonmagnetic material 65 and 66, respectively. A winding 67 is arranged in the interspace between the cylinder 62 and the discs 65 and 66. The rings 63, 64, 65 and 66, are provided with concentric holes to form a central axial aperture in which a cylindrical armature 68 may reciprocate. The cylinder or armature 68 is composed of alternate washers 69 and 70 of magnetic and nonmagnetic material, respectively. The washers of magnetic material 69 are slightly thicker than the washers of nonmagnetic material 70 in order to magnetically bridge the rings 65. The armature 68 is mounted in a suitable manner on the movable electrode 15 to move therewith, while the frame (62, 63, 64, etc.) is mounted on any suitable stationary support. The winding 67 is connected in series with the primary winding 61a of the transformer 61.

The apparatus shown in Fig. 3 functions as follows:

The magnetic flux of the permanent magnet 62 passes from the cylinder 62 radially through the discs 63 and 64, and completes its path in a zig-zag fashion therebetween by passing alternately through the magnetic discs 65 and 69. If the armature 68 moves relative to the stationary part the reluctance of this zig-zag path varies, thus varying the total flux passing through the winding 67 and inducing therein a voltage which is impressed upon the winding 61a and through the transformer 61 upon the grid of the tube 34, thereby varying the current flowing through the tube 34. This current affects in turn, through the transformer 32, the tubes 26 and 27 in the manner aforedescribed in connection with Fig. 1, so that upon motion of the welding jaw 15 the system is caused to function in a manner similar to the operation of the system of Fig. 1, as will be apparent.

The motion responsive welding current initiating means, i. e., the grating and photoelectric tube 38 illustrated in Fig. 1, or the magnetic variable reluctance device 60 of Fig. 3 may be replaced by any other suitable means which affords a transient control current or voltage in response to relative motion of the welding jaws. Thus a magnetostriction gauge may be interposed between the two jaws to take the place of the device 60 in Fig. 3. Furthermore, a relatively stationary phonograph pickup engaging a movable sound track having constant frequency waves engraved thereon may be employed. Other means for producing the variable initiating current or voltage in response to the movement of the welding jaws will be apparent to those skilled in the art.

It will also be apparent that the system may be employed for brazing or soldering whereby two parts are joined by some brazing or soldering material introduced between the surfaces to be joined.

It will further be apparent that the motion responsive means shown herein may be employed to control the supply of welding current by other means than those shown.

Furthermore, while the specification describes specifically the welding of metals, the system, especially when employing high frequency heating may be used for the welding of dielectric materials.

In accordance with the foregoing, wherever the term welding is used in the appended claims, the same is intended to include brazing and soldering, thermoplastic bonding or the control of any other deforming process affording relative motion due to plastic deformation.

We claim:

1. In a welding system, in combination, relatively movable electrodes, a pressure supply for said electrodes, control means subject to control by the pressure to which said electrodes are subjected, control means subject to actuation by relative movement of said electrodes, means under the control of said two control means jointly to supply welding energy to said electrodes, the second mentioned control means comprising means operatively associated with said electrodes for repetitive action as said electrodes in moving into welding relation move into other relations progressively, thus to render the second mentioned control means upon initiation of welding in any of a multiplicity of relations of said electrodes effective to initiate termination of welding as the relation of said electrodes changes with plastic deformation of the material undergoing welding.

2. In a welding system, in combination, relatively movable electrodes, a pressure supply for said electrodes, control means subject to control by the pressure to which said electrodes are subjected, control means subject to actuation by relative movement of said electrodes, electronic means under the control of said two control means jointly to supply welding energy to said electrodes, the second mentioned control means comprising photoelectric means operatively associated with said electrodes for repetitive action as said electrodes in moving into welding relation move into other relations progressively, thus to render the second mentioned control means upon initiation of welding in any of a multiplicity of relations of said electrodes effective to initiate termination of welding as the relation of said electrodes changes with plastic deformation of the material undergoing welding.

3. In a welding system, in combination, relatively movable electrodes, a pressure supply for said electrodes, control means subject to control by the pressure to which said electrodes are subjected, control means subject to actuation by relative movement of said electrodes, electronic means under the control of said two control means jointly to supply welding energy to said electrodes, the second mentioned control means comprising electromagnetic induction means operatively associated with said electrodes for repetitive action as said electrodes in moving into welding relation move into other relations progressively, thus to render the second mentioned control means upon initiation of welding in any of a multiplicity of relations of said electrodes effective to initiate termination of welding as the relation of said electrodes changes with plastic deformation of the material undergoing welding.

4. In a welding system, in combination, relatively movable electrodes, a pressure supply for said electrodes, control means subject to control by the pressure to which said electrodes are subjected, control means subject to actuation by relative movement of said electrodes, means under the control of said two control means jointly to supply welding energy to said electrodes, the third mentioned means including means to automatically vary supply of welding energy to said electrodes according to the electrical resistance between said electrodes, the second mentioned control means comprising means operatively associated with said electrodes for repetitive action as said electrodes in moving into welding relation move into other relations progressively, thus to render the second mentioned control means upon initiation of welding in any of a multiplicity of relations of said electrodes effective to initiate termination of welding as the relation of said electrodes changes with plastic deformation of the material undergoing welding.

5. In a welding system, in combination, relatively movable electrodes, a pressure supply for said electrodes, control means subject to control by the pressure to which said electrodes are subjected, control means subject to actuation by relative movement of said electrodes, electronic means under the control of said two control means jointly to supply welding energy to said electrodes, said electronic means including electronic means to automatically vary the supply of welding energy to said electrodes according to the electrical resistance between said electrodes, the second mentioned control means comprising photoelectric means operatively associated with said electrodes for repetitive action as said electrodes in moving into welding relation move into other relations progressively, thus to render the second mentioned control means upon initiation of welding in any of a multiplicity of relations of said electrodes effective to initiate termination of welding as the relation of said electrodes changes with plastic deformation of the material undergoing welding.

6. In a welding system, in combination, relatively movable electrodes, a pressure supply for said electrodes, control means subject to control by the pressure to which said electrodes are subjected, control means subject to actuation by relative movement of said electrodes, electronic means under the control of said two control means jointly to supply welding energy to said electrodes, said electronic means including electronic means to automatically vary the supply of welding energy to said electrodes according to the electrical resistance between said electrodes, the second mentioned control means comprising electromagnetic induction means operatively associated with said electrodes for repetitive action as said electrodes in moving into welding relation move into other relations progressively, thus to render the second mentioned control means upon initiation of welding in any of a multiplicity of relations of said electrodes effective to initiate termination of welding as the relation of said electrodes changes with plastic deformation of the material undergoing welding.

7. In a welding system, in combination, relatively movable electrodes, pressure supplying means for said electrodes, control means subject to control by the pressure supplied to said electrodes, control means subject to actuation by relative movement of said electrodes resulting from plastic deformation of the material undergoing welding, and means affording said electrodes a controlled supply of welding energy and comprising normally active electronic means rendered inactive by the first mentioned control means when the electrode pressure attains a given value and again active by the second mentioned control means upon response of the latter to plastic deformation, and further comprising electronic means blocked by the former electronic means when active but rendered active by inactivity of said former electronic means, thus to effect supply of welding energy to said electrodes under the control of both of said control means.

8. In a welding system, in combination, relatively movable electrodes, pressure supplying means for said electrodes, control means subject to control by the pressure supplied to said electrodes, control means subject to actuation by relative movement of said electrodes resulting from plastic deformation of the material undergoing welding, and means affording said electrodes a controlled supply of welding energy and comprising normally active electronic means rendered inactive by the first mentioned control means when the electrode pressure attains a given value, and again active by the second mentioned control means upon response of the latter to plastic deformation, and further comprising electronic means blocked by the former electronic means when active but rendered active by inactivity of said former electronic means, thus to effect supply of welding energy to said electrodes under the control of both of said control means, the second mentioned electronic means including electronic means automatically varying the supply of welding energy to said electrodes according to the electrical resistance between said electrodes.

9. In a welding system, in combination, relatively movable electrodes, pressure supplying means for said electrodes, control means subject to control by the pressure supplied to said electrodes, photoelectric control means subject to actuation by relative movement of said electrodes resulting from plastic deformation of the material undergoing welding, and means affording said electrodes a controlled supply of welding energy and comprising normally active electronic means rendered inactive by the first mentioned control means when the electrode pressure attains a given value, and again active by said photoelectric control means upon response of the latter to plastic deformation, and further comprising electronic means blocked by the former electronic means when active but rendered active by inactivity of said former electronic means thus to effect supply of welding energy to said electrodes under the control of both of said control means.

10. In a welding system, in combination, relatively movable electrodes, pressure supplying means for said electrodes, control means subject to control by the pressure supplied to said electrodes, electromagnetic induction control means subject to actuation by relative movement of said electrodes resulting from plastic deformation of the material undergoing welding, and means affording said electrodes a controlled supply of welding energy and comprising normally active electronic means rendered inactive by the first mentioned control means when the electrode pressure attains a given value, and again active by said electromagnetic induction means upon response of the latter to plastic deformation, and further comprising electronic means blocked by the former electronic means when active but rendered active by inactivity of said former electronic means thus to effect supply of welding energy to said electrodes under the control of both of said control means.

IRVIN W. COX.
LESTER D. DRUGMAND.

REFERENCES CITED

The following references are of record in the file of this patent:

UNITED STATES PATENTS

| Number | Name | Date |
|---|---|---|
| 1,043,637 | Smith | Nov. 5, 1912 |
| 1,710,723 | Delano | Apr. 30, 1929 |
| 1,736,428 | Bryant | Nov. 19, 1929 |
| 1,848,905 | Rabezzana | Mar. 8, 1932 |
| 1,967,094 | Lincoln | July 17, 1934 |
| 2,018,379 | Pfeiffer | Oct. 22, 1935 |
| 2,147,468 | Stoddard | Feb. 14, 1939 |
| 2,340,694 | Rogers | Feb. 1, 1944 |
| 2,377,601 | Bayles | June 5, 1945 |
| 2,395,849 | Callom et al. | Mar. 5, 1946 |